(12) United States Patent
Rybarczyk et al.

(10) Patent No.: US 6,922,984 B2
(45) Date of Patent: Aug. 2, 2005

(54) HEAT RECOVERY CIRCUIT

(75) Inventors: Thomas M. Rybarczyk, Solano, CA (US); William McGreehan, Butler, OH (US)

(73) Assignee: Valero Refining Company - California, Benicia, CA (US)

( * ) Notice: Subject to any disclaimer, the term of this patent is extended or adjusted under 35 U.S.C. 154(b) by 74 days.

(21) Appl. No.: 10/649,964

(22) Filed: Aug. 27, 2003

(65) Prior Publication Data

US 2005/0044859 A1 Mar. 3, 2005

(51) Int. Cl.⁷ .............................................. F02C 6/18
(52) U.S. Cl. .................................................. 60/39.182
(58) Field of Search ............................ 60/39.182, 39.5

(56) References Cited

U.S. PATENT DOCUMENTS

| | | | |
|---|---|---|---|
| 3,704,586 A * | 12/1972 | Bruns ........................ 60/39.182 |
| 4,013,877 A | 3/1977 | Uram et al. | |
| 4,047,005 A | 9/1977 | Heiser et al. | |
| 4,201,924 A | 5/1980 | Uram | |
| 4,362,013 A * | 12/1982 | Kuribayashi ................. 60/772 |
| 4,455,614 A | 6/1984 | Martz et al. | |
| 4,706,612 A * | 11/1987 | Moreno et al. ............. 122/7 R |
| 4,784,069 A * | 11/1988 | Stark .......................... 110/211 |
| 4,896,500 A | 1/1990 | Pavel et al. | |
| 5,435,123 A * | 7/1995 | Scholl et al. ................. 60/775 |
| 5,473,898 A | 12/1995 | Briesch | |
| 5,794,431 A * | 8/1998 | Utamura et al. ............. 60/783 |
| 5,881,551 A * | 3/1999 | Dang ...................... 60/39.182 |
| RE36,497 E * | 1/2000 | Tomlinson ................... 60/783 |
| 6,748,733 B2 | 6/2004 | Tamaro | |
| 6,748,734 B1 | 6/2004 | Coleman et al. | |

\* cited by examiner

*Primary Examiner*—Ehud Gartenberg
(74) *Attorney, Agent, or Firm*—Browning Bushman P.C.; C. James Bushman

(57) ABSTRACT

A heat recovery circuit capable of handling fluid flow from a turbine exit to a heat recovery steam generator. The heat recovery circuit includes a primary exhaust line and a by-pass circuit. Included within the by-pass circuit is a pressure reducer that is capable of lowering the pressure within the by-pass circuit to below that of the pressure at the discharge of the turbine. Maintaining the pressure within the by-pass circuit to be lower than the turbine discharge pressure prevents the turbine from stalling during turbine start up and also prevents reverse flow through the turbine after turbine shut down.

10 Claims, 2 Drawing Sheets

HEAT RECOVERY CIRCUIT

BACKGROUND OF THE INVENTION

1. Field of the Invention

The present invention relates generally to the field of heat recovery systems. More specifically, the present invention relates to a heat recovery circuit that is capable of receiving turbine exhaust during all phases of turbine operation, including start up and shut down phases of operation without the use of a dump stack.

2. Description of Related Art

Reference is made to FIG. 1 that shows a typical prior art heat recovery circuit. Heat recovery circuits 50 utilize heat energy within the exhaust from a gas turbine 53 to produce super heated steam from sub-cooled water. More specifically, air from an air supply line 51 and fuel from a fuel supply line 52 are mixed and combusted within a gas turbine 53. The combustion of the air and fuel within the gas turbine 53 rotate turbine wheels within the gas turbine 53, the rotational energy of the turbine wheels is transferred to a generator 54 or other rotating machinery via a shaft 55, thereby transforming the energy of combustion within the gas turbine 53 into electrical or mechanical energy from the generator 54.

The exhaust gas exiting the gas turbine 53 primarily comprises high temperature combustion gases. During normal operation of the heat recovery system 50, the high temperature gases are directed to a heat recovery unit 67, such as a heat recovery steam generator (HRSG). As is well known, during normal operation the turbine exhaust line block valve 62 is kept open while the atmospheric exhaust line block valve 58 is kept closed. Also directed to the heat recovery unit 67 is sub-cooled water via a sub-cooled water line 66. Additionally, there is a forced, draft fan (FD) 70 which is used to supply air to duct burners (not shown) commonly employed to increase steam production over and above that generated by the heat from the turbine exhaust alone. Heat exchangers (not shown) within the heat recovery circuit 50 provide for an exchange of heat energy from the high temperature gases to the sub-cooled water within the heat recovery unit 67. The heat energy that is transferred to the sub-cooled water from the high temperature gas generally is sufficient to cause vaporization of the sub-cooled water thereby producing steam (either super heated or saturated). The steam exits the heat recovery unit 67 via the steam outlet line 68. The steam within the steam outlet line 68 can be piped to a steam turbine (not shown) and used to drive the steam turbine or can be used as process heat. As is the case with the gas turbine 53, the steam turbine can be coupled to a generator so that operation of the steam turbine results in the production of electrical energy.

During normal operation of the gas turbine 53 the pressure of the gas exiting the gas turbine sufficiently exceeds the pressure within the heat recovery circuit 50 so that the turbine exhaust gas readily flows through the heat recovery circuit 50. While the FD-fan is operating, however, during the start up and shut down phases of the gas turbine 53, the pressure within the heat recovery circuit 50 can exceed the pressure of the gas exiting the gas turbine 53 thereby producing a backpressure where the gas turbine 53 connects to the heat recovery circuit 50. This backpressure can have a deleterious effect on the performance of the gas turbine 53, and in some cases even damage the gas turbine 53. To eliminate backpressure during start up and shutdown, the general practice is to redirect the gas exiting the gas turbine 53 from the heat recovery unit 67 into the atmosphere via a dump stack 56. Typically this is accomplished by having the block valve 58 in dump stack 56 open while the turbine exhaust line block valve 62 is closed.

Directing the exhaust gases to the atmosphere can overcome backpressure problems inherent in a heat recovery circuit 50. However, directly emitting combustion exhaust gases into the atmosphere presents other issues, such as environmental concerns. These exhaust gases often comprise nitrogen based oxides (NOx), sulfur-based oxides (SOx), carbon monoxide (CO), or combinations thereof—that are considered pollutants and are thus closely monitored by state and federal environmental agencies. Although the exhaust gases are ultimately released from the heat recovery device 67 to the atmosphere via a stack 11, a typical heat recovery device 67 includes means for reducing the pollutants. These means can include chemical injections, selected catalytic reduction, or other pollutant reduction techniques. Unfortunately, releasing these exhaust gases into the atmosphere at or close to the exit of the gas turbine 53 bypasses the pollution treatment step that occurs in the heat recovery device 67 and therefore results in a release of untreated gases. Since such releases have been determined to be environmentally detrimental, governmental agencies that monitor such heat recovery circuits 50 often assess fines when these releases occur. Therefore, a need exists for a heat recovery circuit that is capable of receiving exhaust combustion gases during all stages of a gas turbine's operation. Further a need exists for a heat recovery circuit that eliminates backpressure occurrences within the heat recovery circuit without emitting untreated exhaust gases into the atmosphere.

BRIEF SUMMARY OF THE INVENTION

Basically, the present invention permits operation of an HRSG to maintain steam production during turbine shutdown or start-up using a forced draft fan. This is accomplished without the use of a diverter stack or "dump stack."

The present invention involves a heat recovery circuit comprising an exhaust gas source, a primary exhaust line in operative communication with the gas source, and a heat recovery system. The primary exhaust line has a first connection point and a second connection point. There is a by-pass exhaust line having a first and a second end. The by-pass exhaust line is connected to the primary exhaust line at the first connection point on its first end, and to the second connection point on its second end. The by-pass exhaust line is capable of receiving exhaust gas from the first connection point and conveying the exhaust gas to the second connection point.

Operatively connected to the primary exhaust line is a backpressure control system selectively capable of reducing the pressure within the by-pass exhaust line to less than the pressure within the primary exhaust line. The present invention can further include a flow control system capable of selectively directing exhaust gas flow through the by-pass exhaust line and through the primary exhaust line.

The flow control system of the present invention is capable of directing the entire amount of exhaust flow received from the exhaust gas source through the primary exhaust line. The flow control system is also capable of directing the entire amount of exhaust flow received from the exhaust gas source through the by-pass exhaust line. The flow control system is further capable of directing a portion of the exhaust flow received from the exhaust gas source through the primary exhaust line and through the by-pass exhaust line.

The backpressure control system of the present invention includes a forced draft fan to motively urge fluid through the by-pass exhaust line. At least one intake port is included that provides for ambient air to be drawn into the by-pass exhaust line. The present invention includes an ambient air flow control system to control the flow of ambient air into the by-pass exhaust line. The heat recovery circuit of the present invention further comprises an inlet by-pass valve operatively coupled with the flow control system, an exit by-pass valve operatively coupled with the flow control system, and an on-off valve disposed within the primary exhaust line operatively coupled with the flow control system.

DETAILED DESCRIPTION OF THE INVENTION

Figure 1:
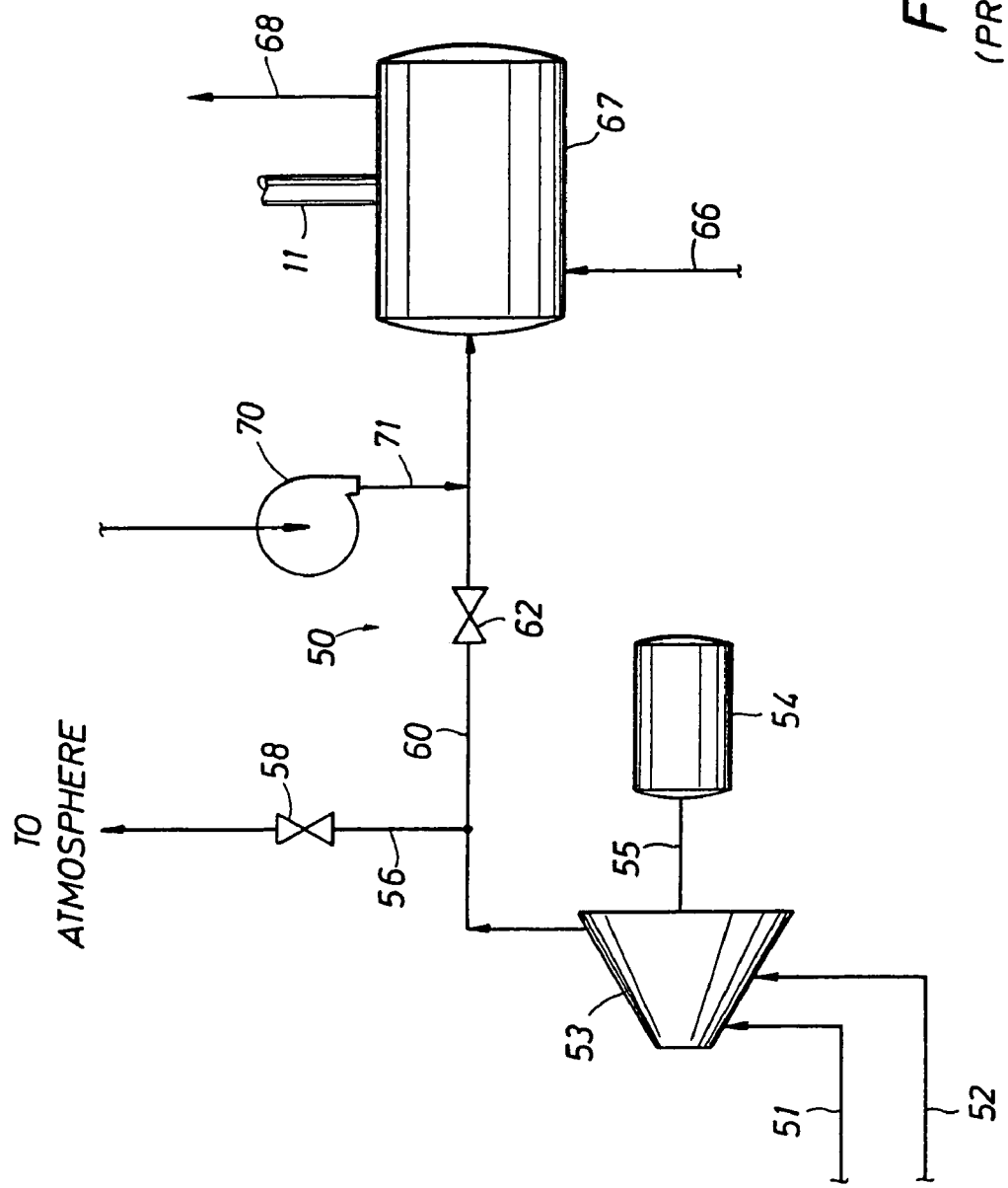
FIG. 1 is a schematical view of a prior art system.
Figure 2:
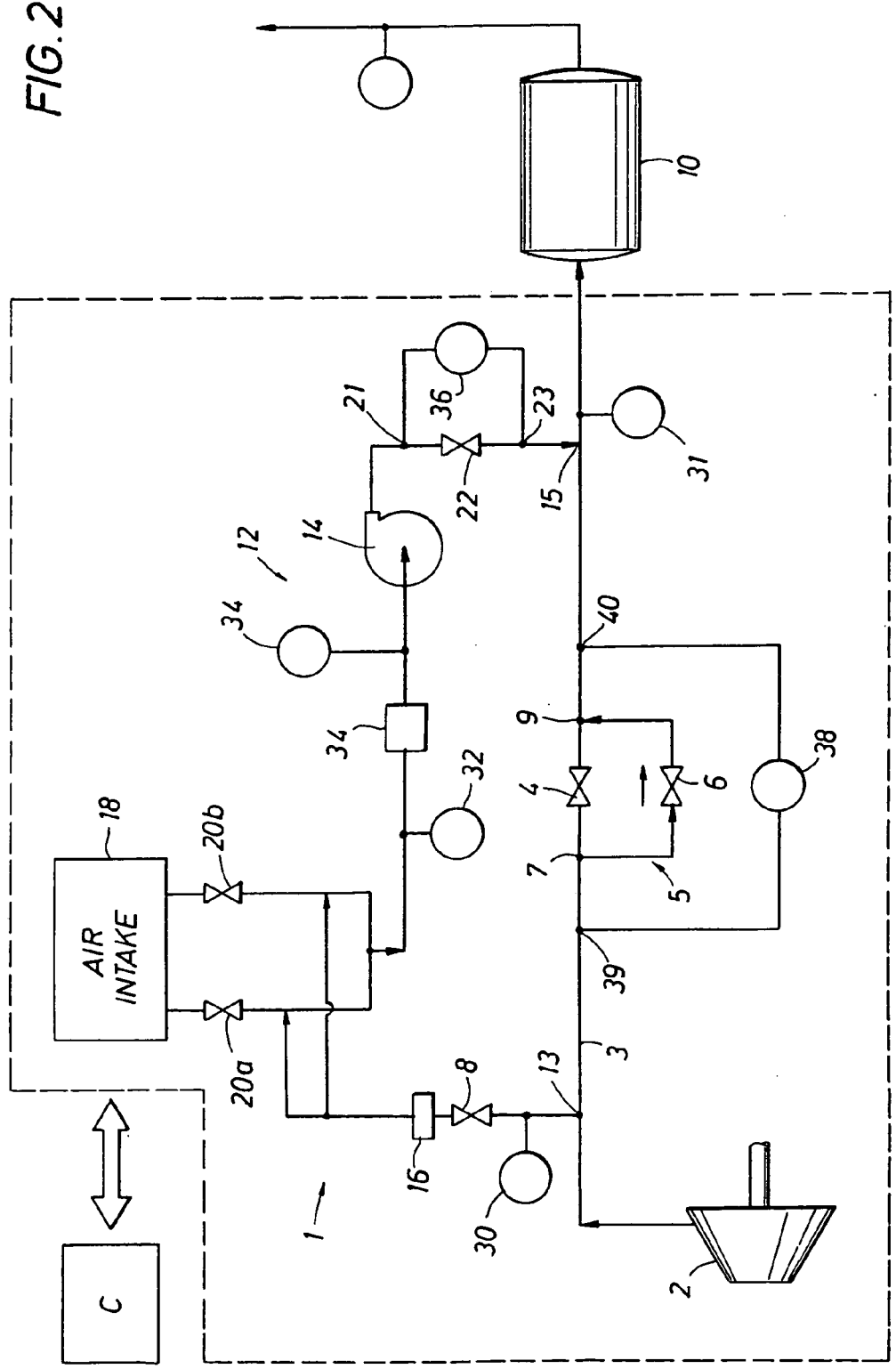
FIG. 2 is a schematical view of one embodiment of the present invention.

With reference to the drawings herein, one embodiment of the heat recovery circuit 1 of the present invention is illustrated in a schematical view in FIG. 2. A control system shown generally as C is used to monitor, command, and control various functions within the heat recovery circuit. As shown in the embodiment of FIG. 2, there is a turbine 2 capable of producing exhaust gas. Typically the turbine can be in the range of 30,000 hp to in excess of 60,000 hp. The exhaust gas exits the turbine 2 and is directed to an exhaust line 3 that provides fluid communication between turbine 2 and a HRSG 10. While it is well known that the length of the exhaust line 3 should be as short as possible in order to minimize pressure and heat losses, the diameter of the exhaust line 3 will be dependent upon the projected design flow of the exhaust exiting the turbine 2. It is within the capabilities of those skilled in the art to determine the appropriate dimensions, design, and material of the exhaust line 3.

Included with the exhaust line 3 is an exhaust valve 4 that when closed precludes fluid flow through the exhaust line 3 thereby isolating the turbine 2 from the HRSG 10. The exhaust valve 4 can be chosen from any of various rotary and reciprocating type valves commonly known and employed, such as a guillotine, butterfly, ball, gate, slide, globe, etc. When fully opened, the exhaust valve 4 allows for free flow of fluid through the exhaust valve 4. Due to the typically large size of the exhaust line 3 (i.e., in excess of 120 inches in diameter), the exhaust valve 4 will usually also be correspondingly large. Thus, when the exhaust valve 4 is of a type that is actuated by reciprocal movement, such as a guillotine, gate, or other slide type valve, the forces required to maintain the exhaust valve 4 in an open position can be quite high. It is therefore preferred that some means, e.g., at least one securing pin (not shown), be included with the exhaust valve 4, the securing means being capable of holding the valve element of the valve in place when the valve is open to ensure that the exhaust valve 4 does not unexpectedly close during turbine operation. It is further preferred that an actuator be used with the exhaust valve 4 to effect its opening and closing. Those skilled in the art are capable of selecting an adequate valve actuator as well as suitable securing means with the exhaust valve 4 without undue experimentation.

Preferably an exhaust valve by-pass 5 is used to provide a fluid flow by-pass around the exhaust valve 4. The exhaust valve by-pass 6 is shunted across the exhaust valve 4, thereby providing a fluid flow path parallel to the exhaust valve 4 for handling the exhaust that exits the turbine 2 and flows through the exhaust line 3. Further, the exhaust valve by-pass 5 is a redundant flow path that allows fluid to flow through it when a pressure differential exists between the exhaust valve by-pass inlet 7 and the exhaust valve by-pass outlet 9. Such a pressure differential can occur if the exhaust valve 4 is shut or not fully opened thus producing a backup of fluid between the turbine 2 and the inlet of the exhaust valve 4. Accordingly, the exhaust valve by-pass 5 should be sized to accommodate the design flow of the exhaust line 3 when used in conjunction with the bypass circuit 12.

Included with the exhaust by-pass 5 is a check valve 6 that is actuated when the pressure at the exhaust valve by-pass inlet 7 exceeds the exhaust valve by-pass exit 9 by a specified pressure. A typical check valve 6 can exceed 36 inches in diameter. Suitable check valves 6 include valves equipped with weights, springs or the like that bias the valve element of the exhaust by-pass valve to the closed position until the specified pressure is applied across the exhaust valve by-pass 5. The magnitude of the specified pressure that causes actuation of the check valve 6 depends on many factors, such as the stall pressure, or back flow pressure of the associated turbine 2.

Another option for redundant fluid flow across the exhaust valve 4 comprises at least one check type valve (not shown) integrated in the exhaust valve 4 itself, referred to as a pressure relieving gate or guillotine. More specifically, the alternative embodiment could include at least one passage (not shown) through the valve element (not shown) of the exhaust valve 4, coupled with a valve element (not shown) biased to the closed position. When the pressure differential across the exhaust valve 4 reaches the specified pressure, the biased valve element will open thereby allowing fluid flow through the opening. Enabling fluid flow through the valve element of the exhaust valve 4 eliminates the likelihood of the pressure at the inlet to the exhaust valve 4 exceeding the specified backpressure that can be applied to the turbine 2 or exceeding the design pressure of the ducting in the exhaust line 3.

A differential pressure indicator 38 monitors the pressure at a point 39 upstream and at a point 40 downstream of the exhaust valve 4. Preferably a control system C can be combined with the differential pressure indicator 38 such that when the pressure at point 39 exceeds the pressure at point 40 by a set amount, the control system can cause the exhaust valve 4 to open. Thus in the preferred embodiment of the present invention, when the control system senses a pressure differential across the exhaust valve 4, the control system would command the valve actuator to operate thereby opening the exhaust valve 4. As is well known, when the exhaust valve 4 is fully opened, the pressure differential across the exhaust valve 4 is substantially eliminated.

In the embodiment shown in FIG. 2, a by-pass circuit, shown generally as 12, has an inlet 13 and an outlet 15 both of which are connected to exhaust line 3. The inlet 13 is on the exhaust line 3 between the turbine 2 and the exhaust valve 4 whereas the outlet 15 is positioned between the exhaust valve 4 and the HRSG 10. Disposed in the circuit 12 proximate to the inlet 13 is an inlet by-pass valve 8. The inlet by-pass valve 8 is preferably a double bladed positive seal gate valve with a pneumatic actuator, but can be any type of valve suitable for providing a means to isolate flow in the by-pass circuit 12 from the exhaust line 3, such as a ball valve, globe valve, or butterfly valve. Further, since it is desired to open and close the inlet by-pass valve 8 quickly and with little delay, the inlet by-pass valve 8 should be operated by a quick response actuator and be remotely actuated.

Located further downsteam of the inlet by-pass valve 8 in by-pass circuit 12 is a by-pass damper 16. Preferably, the by-pass damper 16 is a louvered element being adjustable to provide a variable resistance to fluid flow through the by-pass circuit 12. Variable resistance within the by-pass damper can accordingly be used to control the amount of fluid flow that travels through the by-pass circuit 12. The by-pass damper 16 can be any currently known or later developed device capable of controlling or modulating the fluid flow through the by-pass circuit 12. The bypass circuit 12 ducting is preferably a rectangular duct of about 2 feet in width and 8 feet in height from the inlet connection 13 to the bypass damper 16. From the bypass damper 16 to the fan air intake 18 the ducting is preferably round and about 4 feet in diameter.

An outlet by-pass valve 22 is provided in the by-pass circuit 12 proximate the outlet 15. Like the inlet by-pass valve 8, the outlet by-pass valve 22 is preferably a double bladed positive closure pneumatically actuated gate valve, but can be any type of valve suitable for providing a means to isolate flow into the by-pass circuit 12 from the exhaust line 3. Further, since it is desired to open and close the outlet by-pass valve 22 quickly and with little delay, the outlet by-pass valve 22 should be operated by a quick response actuator and be remotely actuated.

A FD fan air intake 18 is included with the by-pass circuit 12 between the by-pass damper 16 and the outlet by-pass valve 22. Intake valves (20*a* and 20*b*) are situated between the air intake 18 and the by-pass circuit 12. The intake valves (20*a* and 20*b*) are preferably louvered dampers that can be used to regulate the flow of fresh air into the by-pass circuit 12 during different operating modes of the turbine 2 and FD-fan 14. Fluid communication between the fan air intake 18 and the by-pass circuit 12 is intermitted and therefore is selectively activated by means of suitable valve actuators to the intake valves (20*a*, 20*b*). The intake valves (20*a*, 20*b*) are also capable of controlling the pressure at the inlet connection 13 when the turbine 2 is starting up.

Disposed in by-pass circuit 12 and located between the intake valves (20*a* and 20*b*) and the outlet by-pass valve 22 is a FD fan 14. Preferably the FD fan 14 is a centrifugal (squirrel cage) fan with dual intakes of about 8 feet in diameter. The preferred motor used to drive the FD fan 14 is an electric motor of about 600 HP or as required to supply sufficient combustion air to the duct burner system. As will be described in more detail below, when the FD fan 14 is in operation it pulls air into the by-pass circuit 12 via the fan air intake 18. Consequently the pressure within the by-pass circuit 12 is reduced between the inlet 13 and the FD fan 14 due to the FD fan 14 forcing a stream of fluid through the by-pass circuit 12. Optionally a silencer 24 may be included on the by-pass circuit 12 between the air intake valves (20*a* and 20*b*) and FD fan 14.

A differential pressure indicator 36 is included in the by-pass circuit 12 in pressure communication with both the upstream side 21 and the downstream side 23 of the outlet by-pass valve 22. Accordingly the differential pressure indicator 36 is capable of monitoring the pressure in the by-pass circuit 12 on the upstream side 21 and the downstream side 23 of the outlet by-pass valve 22 (which is essentially the pressure at the inlet to the HRSG 10). Knowing these pressures is important since the outlet by-pass valve 22 should only be opened when the pressure at the upstream side 21 of the outlet by-pass valve 22 exceeds the pressure at the inlet to the HRSG 10. Additional pressure indicators 30 and 32 are provided in the by-pass circuit 12 proximate to the inlet 13 and between the intake valves (20*a* and 20*b*) and the FD fan 14. The pressure indicator 32 upstream of the FD fan 14 is primarily for information, and to verify proper mechanical operation of the FD-fan 12.

The bypass damper 16 controls the pressure at the pressure indicator 30 with a temperature override based on the temperature indicator 34. The temperature override is designed to prevent hot gases from reaching and damaging the FD 14. The inlet bypass valve 8 is primarily an open/closed valve used to provide positive isolation. Upon initiation of the FD fan 14, the control system C waits for a signal indicating that the outlet bypass valve 22 has opened before the control system C will provide a corresponding signal to open the inlet bypass valve 8. Similarly, before the FD fan 14 is commanded to shut down, the control system C first commands the inlet bypass valve to close then initiates a command that the outlet bypass 22 be closed. Once both the inlet and outlet bypass valves (8, 22) are closed, the control system C will allow the FD fan 14 to be shut down. Furthermore, to ensure the reliability of the pressure monitoring, the pressure indicators 30 and 31 proximate to inlet 13 and outlet 15 are each triplicated. As is well known, triplicating an instrument involves placing instrument probes within a line in three different taps, however the taps should be in relatively close proximity to one another such the instrument in each tap can be expected to provide substantially the same data reading. Providing dedicated taps to each instrument probe avoids the situation where a clog in a single pressure tap can affect all of the triplicated instruments.

During normal operation when the turbine 2 is operating at normal design speed and operational conditions, the exhaust gas exiting the turbine 2 travels through the exhaust line 3 and valve 4, which is pinned open, to the HRSG 10. When the turbine 2 is running at normal design speed, both the inlet by-pass valve 8 and the outlet by-pass valve 22 are in the closed position thereby blocking any fluid communication between the by-pass circuit 12 and the exhaust line 3.

One purpose of the by-pass circuit 12 is to ensure that no backpressure exists at the exhaust of the turbine 2. A backpressure occurs when the pressure at the exhaust of the turbine 2 is higher than the pressure at its entrance. During start up of the turbine 2 a backpressure can cause the turbine 2 to stall. Further, when the turbine 2 is being shut down, backpressure can prevent the turbine from adequately cooling itself resulting in possible damage. When the turbine is not operating, backpressure will cause the turbine wheels (not shown) to rotate in the direction opposite to their normal rotational direction. Since gas turbines are typically not designed for this reverse rotation, the turbine 2 can be damaged if the wheels are allowed to counter-rotate.

To prevent backpressure during startup and shutdown the gas exhaust exiting the turbine 2 can be diverted from the exhaust line 3 into the by-pass circuit 12; this diverting of exhaust gases is referred to as a flying takeover. Throughout normal operations and when the system is shut down, inlet and outlet bypass valves (8 and 22) should be in the closed position and the exhaust valve 4 should be in the open position. These valves should be in the same position during the initial stages of a normal turbine 2 start up, to prevent backpressure from accumulating at the exit of the turbine 2. When the FD fan 14 is running, prior to the startup of the turbine 2, the exhaust valve 4 and the check valve 6 are in the closed position while the valve 8, the by-pass damper 16, and the valve 22 are in the open position. As fuel is being introduced to the turbine 2, low pressure is induced within the by-pass circuit 12 upstream of the fan intake 18 by partially closing the intake valves (20a and 20b). This also draws ambient air into the by-pass circuit 12, through the FD fan 14, and ultimately into the HRSG 10. Partially closing the intake valves (20a and 20b) also reduces the pressure at the outlet connection 15 by reducing the combustion airflow through the HRSG 10. Initiation of the turbine 2 can begin when the pressure at the inlet 13 to the by-pass circuit 12 is low enough to prevent a backpressure condition, the pressure at the inlet 13 to the by-pass circuit 12 is being monitored by a pressure indicator 30. Thus as the turbine is being started up, the turbine exhaust is directed through the by-pass circuit 12 and around the exhaust valve 4 and the check valve 6.

Upon activation of the turbine 2, and as the speed of the turbine 2 increases, the pressure at pressure indicator 30 just upstream of the inlet bypass valve 8 will begin to rise only when the bypass damper 16 has reached its full open position. Eventually this pressure will exceed the pressure at the outlet connection 15 and the readings taken by the differential pressure indicator 38 will reflect this pressure differential as a positive value. The positive value reading obtained by the differential pressure indicator 38 will be processed by the control system C and a signal will be produced by the control system C commanding the exhaust valve 4 to go open. Partially closing the intake valves (20a and 20b) during start up of the turbine 2 maximizes the flow of turbine exhaust through the FD fan 14. This delays the opening of the exhaust valve 4 and minimizes the backpressure on the turbine 2 during the entire start up sequence, thus minimizing stall conditions.

Eventually, the turbine 2 reaches normal operational speed (synchronous idle) where some backpressure at the turbine exit is no longer detrimental to its function. When the turbine 2 reaches synchronous idle it is typically desired to redirect the gas exhaust from the by-pass circuit 12 into the gas exhaust line 3—thereby putting the heat recovery circuit 1 into normal operating mode. Upon reaching synchronous idle speed, a command is initiated by the control system C to open the exhaust valve 4, irrespective of its current position. Once the exhaust valve 4 is fully opened so that the exhaust line 3 can handle all of the fluid flow exiting the turbine 2, the inlet and outlet by-pass valves (8 and 22) are closed and the FD fan 14 is shut off.

During shutdown of the turbine 2 the flying takeover procedure is similar to the startup sequence. As the turbine 2 begins to shutdown the intake valves (20a and 20b) are partially closed and the FD fan 14 is started. Running the FD fan 14 after partially closing the intake valves (20a and 20b) reduces the ambient air into the by-pass circuit 12 and maximizes the turbine exhaust flow to the FD fan 14. The control system C prevents the FD fan 14 from operating in a shut in condition by commanding the outlet by-pass valve 22 to open. This allows ambient air to flow into the exhaust line 3 just upstream of the HRSG 10. The outlet by-pass valve 22 is commanded open based on a positive pressure reading observed by the differential pressure indicator 36. The differential pressure indicator 36 is also preferably coupled with the control system C to control the operation of the outlet by-pass valve 22. Automatic control of the outlet by-pass valve 22 ensures that it can be opened and closed at the proper time and in the correct sequence. After the outlet by-pass valve 22 is opened, the inlet by-pass valve 8 is also opened to allow exhaust from the turbine 2 to enter the by-pass circuit 12, thereby by-passing the exhaust line 3. Once the inlet by-pass valve 8 and the outlet by-pass valve 22 are fully opened and the FD fan 14 is fully operational, the exhaust valve 4 is slowly modulated and begins to close. Control and command of the exhaust valve 4 is based on data recorded from the differential pressure indicator 38. Full closure of the exhaust valve 4 causes all of the turbine 2 exhaust gases to flow through the by-pass circuit 12 and onto the HRSG 10—without allowing backpressure to exist at the exit of the turbine 2. Therefore, utilization of the present invention with an exhaust gas source provides the ability to eliminate the possibility of backpressure at the turbine exhaust exit in all operational modes without directing untreated exhaust gas to atmosphere. Instead, the present invention enables the exhaust gas sources to operate in modes that are susceptible to backpressure conditions and yet still direct the exhaust gas to a heat recovery generator where certain pollutants within the exhaust gas can be treated.

Temperature and pressure controls are provided in the exhaust line 3 and the by-pass circuit 12 to aid in the operation of the flying takeover procedure and to monitor fluid conditions of the gas exhaust. As previously noted, pressure indicators 30 and 32 are located in the by-pass circuit 12 proximate to the inlet 13 and between the intake valves (20a and 20b) and the FD fan 14. Differential pressure indicators 36 and 38 are disposed in the by-pass circuit 12 and the exhaust line 3 that monitor the pressure differential across the outlet by-pass valve 22 and the exhaust valve 4 respectively. In addition to pressure monitoring, the temperature within the by-pass circuit 12 is monitored by a temperature indicator 34 disposed in the by-pass circuit 12 upstream of the FD fan 14. The FD fan 14 can be damaged by high temperature, thus it is important to monitor the temperature of the gas flowing into the FD fan 14. If the temperature in the FD fan 14 approaches the point at which the FD fan 14 can be damaged, the gas turbine exhaust can be reduced through the by-pass circuit 12 that can correspondingly lower the temperature of the gas flowing into the FD fan 14. This prevents damaging the FD fan 14 due to overheating. The temperature reading obtained from the temperature indicator 34 is used to control the flow through the bypass damper 16 in order to protect the FD fan 14 from high temperatures.

Since the gas exiting the turbine 2 that flows through the exhaust line 3 can be quite hot and exceed 450° C., both the inlet and outlet by-pass valves (8 and 22) should have positive closure and allow for no leakage. Zero leakage is also required to prevent any untreated turbine exhaust from bypassing the catalytic controls in the HRSG and flowing directly to atmosphere. Preferably these valves are comprised of a double block valve, where each valve is remotely activated and can be quickly opened or closed.

As previously noted, utilization of a control system is preferred with the present invention. The control system C for use with the present invention should be capable of monitoring the physical conditions of the heat recovery circuit 1, evaluating if any action is required (i.e. opening/closing valves, activating/deactivating equipment, among other actions), and carrying out the required action. Carrying out the required action typically involves the control system C sending a control command signal to activate or deactivate rotating machinery, such as the turbine 2 or the FD fan 14. Command signals can also be distributed to open or close the remotely operated valves within the heat recovery circuit 1 as well as adjusting the flow resistance within the by-pass damper 16 or intake valves (20a and 20b). It is believed that it is within the capabilities of one skilled in the art to develop and implement an adequate control system for use with the present invention without undue experimentation.

The present invention described herein, therefore, is well adapted to carry out the object and attain the ends and advantages mentioned, as well as others inherent therein. While a presently preferred embodiment of the invention has been given for purposes of disclosure, numerous changes exist in the details of the manner and procedures for accomplishing the desired results. This and other similar modifications will readily suggest themselves to those skilled in the art, and are intended to be encompassed within the spirit of the present invention disclosed herein and the scope of the appended claims.

What is claimed is:

1. A heat recovery circuit comprising:
    a gas-turbine exhaust gas source;
    a primary exhaust line in operative communication with said exhaust gas source and a heat recovery system, said primary exhaust line having a first connection point downstream the gas turbine and a second connection point upstream the heat recovery system;
    a by-pass exhaust line having a first end and a second end, said by-pass exhaust line connected to said primary exhaust line at said first connection point on its first end, and to said second connection point on its second end, said by-pass exhaust line being capable of receiving exhaust gas from said first connection point and conveying the exhaust gas to said second connection point;
    a backpressure control system operatively connected to said primary exhaust line and selectively capable of reducing the pressure within said by-pass exhaust line to less than the would be pressure within said primary exhaust line in absence of said back pressure control system and said by-pass exhaust line; and
    a flow control system capable of selectively directing exhaust gas flow through said by-pass exhaust line and through said primary exhaust line.

2. The heat recovery circuit of claim 1, wherein said flow control system is capable of directing the entire amount of exhaust flow received from the exhaust gas source through said primary exhaust line.

3. The heat recovery circuit of claim 1, wherein said flow control system is capable of directing the entire amount of exhaust flow received from the exhaust gas source through said by-pass exhaust line.

4. The heat recovery circuit of claim 1, wherein said flow control system is capable of directing a portion of the exhaust flow received from the exhaust gas source through said primary exhaust line and through said by-pass exhaust line.

5. The heat recovery circuit of claim 1, wherein said backpressure control system includes a forced draft fan to motively urge fluid through said by-pass exhaust line.

6. The heat recovery circuit of claim 1, further comprising an intake port that provides for ambient air to be drawn into said by-pass exhaust line.

7. The heat recovery circuit of claim 6 further comprising an ambient air flow control system to control the flow of ambient air into said by-pass exhaust line.

8. The heat recovery circuit of claim 1 further comprising an inlet by-pass valve operatively coupled with said flow control system.

9. The heat recovery circuit of claim 1 further comprising an outlet by-pass valve operatively coupled with said flow control system.

10. The heat recovery circuit of claim 1 further comprising an on-off valve disposed within said primary exhaust line operatively coupled with said flow control system.

* * * * *